United States Patent
Olry et al.

(10) Patent No.: US 7,384,663 B2
(45) Date of Patent: Jun. 10, 2008

(54) METHOD OF MAKING A THREE-DIMENSIONAL FIBER STRUCTURE OF REFRACTORY FIBERS

(75) Inventors: Pierre Olry, Bordeaux (FR); Yannick Claude Breton, Orleans (FR); Sylvie Bonnamy, Orleans la Source (FR); Nathalie Nicolaus, Lyons (FR); Christian Robin-Brosse, Le Haillan (FR); Eric Sion, Lyons (FR)

(73) Assignee: Snecma Propulsion Solide, Le Haillan (FR)

( * ) Notice: Subject to any disclaimer, the term of this patent is extended or adjusted under 35 U.S.C. 154(b) by 280 days.

(21) Appl. No.: 11/077,005

(22) Filed: Mar. 10, 2005

(65) Prior Publication Data
US 2005/0176329 A1  Aug. 11, 2005

Related U.S. Application Data

(63) Continuation-in-part of application No. PCT/FR2003/002692, filed on Sep. 11, 2003.

(30) Foreign Application Priority Data
Sep. 12, 2002  (FR) .................................. 02 11302

(51) Int. Cl.
*B05D 5/12* (2006.01)
*C23C 16/00* (2006.01)
(52) U.S. Cl. .............. 427/122; 427/249.1; 427/249.2; 427/249.3; 427/301; 427/430.1

(58) Field of Classification Search ............... 427/122, 427/249.1, 249.2, 249.3, 430.1, 301
See application file for complete search history.

(56) References Cited

U.S. PATENT DOCUMENTS

| 4,663,230 | A | 5/1987 | Tennent |
| 2004/0247808 | A1* | 12/2004 | Cooper et al. ............. 428/36.1 |
| 2006/0062944 | A1* | 3/2006 | Gardner et al. ............ 428/34.1 |
| 2007/0128960 | A1* | 6/2007 | Ghasemi Nejhad et al. .. 442/59 |

FOREIGN PATENT DOCUMENTS

WO  WO 01/30694  5/2001

OTHER PUBLICATIONS

Thostenson, E.T., et al: "Carbon nanotube/carbon fiber hybrid multiscale composites," Journal of Applied Physics, May 1, 2002, AIP, USA, vol. 91, No. 9, pp. 6034-6037.
Smiljanic, O., et al: "Growth of carbon nanotubes on Ohmically heated carbon paper," Chemical Physics Letters, Jul. 20, 2001, Elsevier, Netherlands, vol. 342, No. 5-6, pp. 503-509.

* cited by examiner

*Primary Examiner*—Brian K. Talbot
(74) *Attorney, Agent, or Firm*—Weingarten, Schurgin, Gagnebin & Lebovici LLP (57) ABSTRACT

Carbon nanotubes are incorporated in the fiber structure by growing them on the refractory fibers of the substrate so as to obtain a three-dimensional substrate made of refractory fibers and enriched in carbon nanotubes. The substrate is densified with a matrix to form a part of composite material such as a friction part of C/C composite material.

22 Claims, 5 Drawing Sheets

METHOD OF MAKING A THREE-DIMENSIONAL FIBER STRUCTURE OF REFRACTORY FIBERS

This is a continuation-in-part of International Application No. PCT/FR2003/002692 with an international filing date of Sep. 11, 2003, which claims priority from French patent application No. 02 11302 filed Sep. 12, 2002.

BACKGROUND OF THE INVENTION

The invention relates to porous three-dimensional (3D) fiber structures made of refractory fibers. In particular it relates to such structures for constituting fiber preforms for making parts out of thermostructural composite material.

A particular field of application of the invention is the manufacture of friction parts, such as brake disks, having a carbon fiber reinforcement.

Thermostructural composite materials are well known for their good mechanical properties which make them suitable for constituting structural elements, and for their ability to retain these properties at high temperatures. They comprise in particular carbon/carbon (C/C) composite materials having carbon fiber reinforcement densified by a matrix of carbon, and ceramic matrix composite (CMC) materials having refractory fiber reinforcement (carbon fibers or ceramic fibers) densified by a matrix of ceramic material. Thermostructural composite materials find applications in particular in the fields of aviation and space, and in the field of friction, specifically for aircraft brake disks.

Composite material parts are usually fabricated by making a fiber preform which is to constitute the fiber reinforcement of the composite material, and by densifying the preform with the matrix of the composite material.

The preform is a porous fiber structure made up of fibers, yarns, or tows. Typical methods for making 3D fiber structures enabling preforms to be obtained having shapes that structures enabling preforms to be obtained having shapes that correspond to the shapes of the composite material parts that are to be fabricated include the following:

winding on a former or mandrel;
making thick felts;
three-dimensional weaving, knitting, or braiding; and
draping or superposing plies made of two-dimensional (2D) fabric and optionally bonded to one another; the 2D fabric may be a woven cloth, a sheet of unidirectional filaments, a multidirectional sheet made up of a plurality of unidirectional sheets superposed in different directions and bonded together, e.g. by needling or stitching, a layer of felt, or indeed a laminate comprising a cloth or sheet coated in a layer of free fibers that are bonded to the cloth or sheet by needling.

A typical method of making a 3D fiber structure intended specifically for preparing preforms for thermostructural composite material disks consists in superposing plies made of layers of cloth or multidirectional sheet and in bonding them together by needling. One such method is described in particular in document U.S. Pat. No. 4,790,052. The fiber structure can be made from fibers that constitute precursors of the carbon or ceramic material constituting the fiber reinforcement of the composite material. The precursor is then transformed into carbon or ceramic by heat treatment, prior to being densified by the matrix.

The fiber structure may alternatively be made directly out of carbon fibers or ceramic fibers. In which case, the layers of cloth or multidirectional sheet can be provided with a layer of free fibers constituting a source of fibers suitable for being taken by the needles while the plies are being needled together.

A fiber preform can be densified with its matrix by a liquid process and/or a gaseous process. The liquid process consists in impregnating the preform with a liquid composition containing a precursor of the matrix and in subsequently transforming the precursor by heat treatment so as to obtain the desired matrix material. Typically, the precursor is a resin. The gaseous process is chemical vapor infiltration (CVI). The preform is placed in an oven into which a gas is admitted containing one or more components forming a gaseous precursor for the matrix material. The conditions inside the oven, in particular temperature and pressure, are adjusted so as to enable the gas to diffuse into the pores of the preform and deposit matrix material on the fibers of the preform, either by a component of the gas decomposing, or else by a reaction between a plurality of components. Such methods are well known in themselves, both for forming carbon matrices and for forming ceramic matrices.

Proposals have already been made to introduce fillers into the pores of fiber structures that are to constitute the fiber reinforcement of thermostructural composite material parts prior to densifying the fiber structures with the composite material matrix. The intended purposes are to reduce the fraction of the volume of the fiber structure that is represented by the pores in order to reduce the time taken by densification, and/or to impart special properties to the resulting composite material parts, and in particular to improve mechanical properties.

The fillers consist in particular of powders or of short fibers made of carbon or ceramic. A known method of introducing fillers consists in impregnating the 3D fiber structure with a suspension of fillers in a liquid. Nevertheless, it is found in practice to be impossible to distribute the fillers in desired manner within fiber structures, i.e. in uniform manner or in a manner that is not uniform but that is controlled.

OBJECTS AND SUMMARY OF THE INVENTION

An object of the invention is to overcome this difficulty so as to provide 3D fiber structures in satisfactory manner both for improving the properties of composite material parts obtained by densifying preforms made of such fiber structures and for improving the method of fabricating the parts.

This object is achieved by a method of making a porous three-dimensional fiber structure comprising a coherent three-dimensional substrate of refractory fibers, in which method, in accordance with the invention, carbon nanotubes are incorporated in the fiber structure by being grown on the refractory fibers of the substrate, after it has been impregnated by a composition comprising at least one catalyst for carbon nanotube growth, so as to obtain a three-dimensional structure made of refractory fibers and enriched in carbon nanotubes.

A fiber structure or substrate is said herein to be "coherent" when it is capable of retaining its cohesion while it is being handled.

Carbon nanotubes and methods of preparing them are well known. It is also known to make use of carbon nanotubes to constitute the fiber reinforcement of carbon or ceramic matrix composite materials. Reference can be made, for example, to the documents U.S. Pat. No. 4,663,230 and EP 1 154 050.

The present invention does not lie in constituting composite material fiber reinforcement by means of carbon nanotubes, but lies rather in enriching a 3D fiber structure made of refractory fibers with carbon nanotubes obtained by being grown on the refractory fibers.

Thus, while retaining the organization and cohesion qualities of a coherent 3D fiber structure which are essential for conferring desired mechanical properties to composite material parts having fiber reinforcement comprising such a structure, the method of the invention provides a certain number of advantages by incorporating carbon nanotubes.

In 3D fiber structures, growing carbon nanotubes on the fibers of the substrate makes it possible to distribute the carbon nanotubes within the pores of the fiber structures.

In the method of fabricating composite material parts, this leads to a reduction in the duration of densification because of the reduction in the volume fraction occupied by the pores as a result of the presence of carbon nanotubes in the 3D structure. In addition, the nanotubes achieve this reduction of pore volume in the 3D substrate by subdividing the pores without creating obstacles to densification (closing off pores), regardless of whether densification is performed by a liquid process or a gaseous process. Subdividing the pores in this way contributes to making them less non-uniform, and thus enables densification to be less irregular.

In composite material parts having fiber reinforcement formed by such a 3D fiber structure, the following are obtained:

an improvement in mechanical properties as a result of incorporating additional reinforcing filamentary elements of very high mechanical strength;

an improvement in resistance to wear; and improved thermal conductivity.

In one implementation of the method, it comprises the following successive steps:

impregnating two-dimensional plies of refractory fibers with a composition containing at least one catalyst for carbon nanotube growth;

forming a three-dimensional substrate by superposing and bonding together a plurality of impregnated two-dimensional plies; and causing carbon nanotubes to grow within the three-dimensional substrate.

The 2D plies are advantageously bonded together by needling.

The 3D fiber structure is enriched with carbon nanotubes in uniform manner throughout the volume of the fiber structure.

In another implementation of the method, it comprises the following successive steps:

a) impregnating refractory fiber two-dimensional plies with a composition containing at least one catalyst for carbon nanotube growth;

b) causing carbon nanotubes to grow within the two-dimensional plies; and c) forming the three-dimensional fiber structure by superposing and bonding together two-dimensional plies of refractory fibers in which at least some of the plies contain carbon nanotubes obtained by steps a) and b).

With this implementation of the invention, it is possible to form the 3D fiber structure by stacking 2D plies having varying quantities of carbon nanotubes. It is thus possible, if so desired, to modulate the quantity of carbon nanotubes within the volume of the 3D fiber structure in controlled manner, and even to arrange for portions of the 3D fiber structure to be free from any carbon nanotubes.

By way of example, the 2D plies may be bonded together by needling. In which case, it is possible to place a layer of free fibers on each of at least some of the two-dimensional plies prior to needling.

In yet another implementation of the invention, it comprises the following successive steps:

making a three-dimensional substrate of refractory fibers;

impregnating the substrate with a composition containing at least one catalyst for carbon nanotube growth; and causing carbon nanotubes to grow within the three-dimensional substrate.

Thus, the 3D substrate of refractory fibers can be enriched in uniform manner with carbon nanotubes throughout its entire volume.

The 3D substrate may be made by superposing 2D plies and bonding them to one another, e.g. by needling. In a variant, the 3D substrate may be made by three-dimensional weaving, knitting, or braiding of yarns or tows.

According to a feature of the method, impregnation is performed using a composition containing at least one catalyst for carbon nanotube growth on refractory fibers having a specific surface area of not less than 10 square meters per gram ($m^2/g$), in order to distribute particles of catalyst thoroughly over the surface of the fibers. It can then be necessary to apply surface treatment to the fibers, e.g. by controlled oxidation (using an oxidizing gas, chemical or electrical attack, or a plasma, for example) in order to obtain the desired surface state.

Impregnation is advantageously performed by a composition containing a solution of at least one salt of a metal constituting a catalyst for carbon nanotube growth.

A step of eliminating metal catalyst particles by acid attack or by high temperature heat treatment may be performed after the 3D fiber structure enriched in carbon nanotubes has been made.

According to a feature of the method, additional carbon nanotubes may be introduced into the pores of at least a surface portion of the fiber structure, e.g. by bringing a liquid containing a suspension of carbon nanotubes to the surface of the fiber structure. This serves to fill in the surface pores and greatly reduces the volume fraction they occupy. After a subsequent step of densifying the fiber structure, e.g. by chemical vapor infiltration, this makes it possible to obtain a resulting composite material part that has a sealed surface.

The invention also provides a coherent 3D fiber structure as can be obtained by a method as defined above, i.e. a three-dimensional fiber structure comprising a coherent porous three-dimensional substrate of refractory fibers and also of carbon nanotubes which are distributed throughout the pores of the substrate.

The refractory fibers may be of carbon or of ceramic.

The carbon nanotubes preferably represent 5% to 200% by weight of the weight of the refractory fibers.

The 3D substrate may be made up of 2D substrates bonded to one another by needling.

The invention also provides a thermostructural composite material part such as obtained by densifying with a refractory matrix a fiber preform comprising a three-dimensional fiber structure made by a method as defined above, in particular a friction part such as a brake disk having a carbon fiber reinforcement.

BRIEF DESCRIPTION OF THE DRAWINGS

The invention will be better understood on reading the following description given by way of non-limiting indication with reference to the accompanying drawings, in which.

DETAILED DESCRIPTION OF IMPLEMENTATIONS

Figure 1:
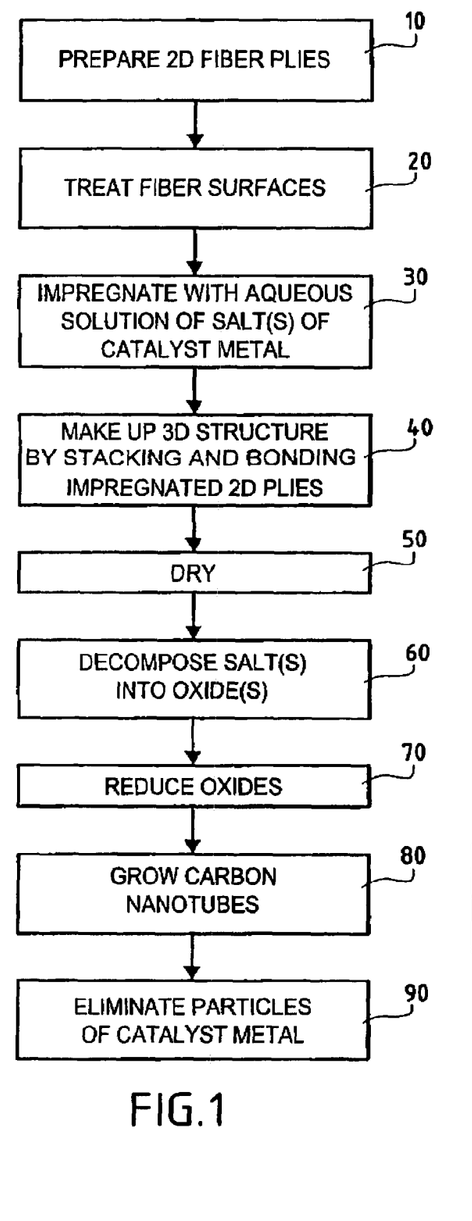
FIG. 1 shows the successive steps of one implementation of a method of the invention.

Reference is made initially to FIG. 1 which shows the successive steps of a method of making a three-dimensional fiber structure enriched with carbon nanotubes in a first implementation of the invention.

The first step 10 of the method consists in preparing two-dimensional (2D) fiber plies.

The plies may be in the form of unidirectional or multidirectional sheets, woven cloth, knits, braids, mats, or thin felts. The sheets, cloths, knits, or braids may be made using yarns, tows, or slivers of continuous or discontinuous filaments. Discontinuous-filament yarns, tows, or slivers can be obtained by drawing and bursting continuous-filament yarns, tows, or slivers. Where necessary, cohesion can be imparted to discontinuous-filament yarns or tows by covering or by twisting. Unidirectional sheets are obtained by spreading yarns, tows, or slivers, that have optionally been subjected to drawing and bursting, so as to obtain unidirectional sheets of continuous or discontinuous filaments lying substantially parallel to one another. Multidirectional sheets are obtained by superposing unidirectional sheets in different directions and bonding the sheets together, e.g. by stitching or by needling. The plies may also be in the form of laminates comprising a layer constituted by a unidirectional or multidirectional sheet or by a cloth, and surmounted by a layer of discontinuous fibers made up of free fibers, mat, or felt, the two layers being bonded together, e.g. by needling. These methods for obtaining 2D plies suitable for making 3D fiber structures are well known. Reference can be made in particular to the following documents: U.S. Pat. No. 4,790,052, U.S. Pat. No. 5,228,175, and WO 98/44183.

The plies may be made from filaments, yarns, tows, or slivers of refractory fibers, in particular fibers of carbon or of ceramic. In a variant, the plies may be formed from filaments, yarns, tows, or slivers of fibers made of a precursor for carbon or a ceramic, with the precursor being transformed into carbon or ceramic by heat treatment (pyrolysis) after the plies have been formed. By way of example, carbon fiber precursors are pre-oxidized polyacrylonitrile (PAN) fibers, isotropic or anisotropic pitch fibers, and cellulose fibers, e.g. rayon fibers.

It is preferable for the refractory fibers forming the 2D plies to present a surface state that makes it possible for particles of carbon nanotube growth catalyst to be well distributed on their surface.

With carbon fibers, rayon precursor fibers present a specific surface area that is relatively high (typically about 250 $m^2/g$), and thus present a surface state that is favorable for this purpose.

This is generally not the case with carbon fibers from a pitch or a pre-oxidized PAN precursor, which fibers are therefore preferably subjected to surface treatment (step 20). This surface treatment may be moderate activation treatment, for example by oxidation in air (or steam and/or carbon dioxide) enabling the specific surface area of the carbon fibers to be raised to a value that is preferably greater than 10 $m^2/g$. It is also possible to perform surface treatment by chemical attack, in particular by means of oxygenated water, by acid attack, e.g. using nitric acid, or indeed by electrochemical attack, by plasma, . . . .

With ceramic fibers, the surface treatment consists in providing the fibers with a carbon coating so as to obtain a desired specific surface area, possibly after activation. The carbon coating may be a layer of pyrolytic carbon formed on the fibers by chemical vapor infiltration, or a coating of pyrolytic carbon obtained by pyrolyzing a layer of carbon precursor deposited on the fibers, e.g. a layer of phenolic resin, furan resin, or some other resin having a non-zero coke content.

It should be observed that the surface treatment of carbon or ceramic fibers can be performed prior to forming the 2D plies, if the plies are themselves made from filaments, yarns, tows, or slivers of carbon or ceramic fibers.

After optional surface treatment of the fibers, the 2D plies are impregnated in an aqueous solution of one or more salts of a metal that catalyzes the growth of carbon nanotubes (step 30). Catalysts for carbon nanotube growth are known and are constituted by metals selected in particular from iron, cobalt, and nickel. These metals may be used singly or in alloys. By way of example, the salts used are nitrates or acetates. Impregnation may be performed by immersing the plies in a bath or by spraying the plies.

The concentration of salt(s) in the aqueous solution is such that the quantity of catalyst (specified in metal moles) preferably lies in the range 0.01 molar percent to 1 molar percent.

The impregnated and possibly dried 2D plies are subsequently superposed and bonded together to form a coherent 3D structure (step 40). Bonding may be performed by implanting yarns transversely to the plies, by stitching, or preferably by needling, e.g. as described in above-cited document U.S. Pat. No. 4,790,052.

Needling is preferably performed on moist plies in order to avoid problems that might be encountered with solid metal salts being present after the plies have dried. In order to make fibers easier for the needles to catch in order to transfer them through the plies, the 2D plies preferably comprise filaments that are discontinuous, e.g. being formed either of sheets or cloth made of yarns, tows, or slivers of discontinuous filaments, or else laminates comprising a layer of sheet or cloth bonded to a layer of discontinuous filaments.

After needling, the resulting 3D structure is dried (step 50) e.g. by being passed through a ventilated stove.

The metal catalyst salt(s) is/are decomposed into oxide(s) by heat treatment, e.g. by raising the dried 3D fabric to a temperature lying in the range 100° C. to 500° C. (step 60). Steps 50 and 60 may advantageously constitute a single, combined step.

Thereafter, the 3D fabric is introduced into an oven under a reducing atmosphere for hot reduction of the catalyst oxide(s) (step 70). Reduction is performed, for example, under gaseous ammonia ($NH_3$) or under gaseous hydrogen ($H_2$) at a temperature lying in the range 400° C. to 750° C., for example. The ammonia and hydrogen gases may be diluted in an inert gas, e.g. nitrogen.

This provides a 3D fiber substrate of refractory fibers having metal particles of catalyst for carbon nanotube growth distributed in discontinuous manner on their surface.

Carbon nanotubes are grown (step 80) by bringing a gaseous carbon precursor into contact with the fibers of the 3D substrate placed in an oven at a temperature enabling carbon to be formed by decomposing (cracking) the gaseous precursor. The oven may be the same as the oven used for reducing the metal catalyst oxide(s).

The gaseous precursor is selected from aromatic or non-aromatic hydrocarbons. For example, acetylene, ethylene, propylene, or methane is used with the temperature in the oven then lying in the range about 450° C. to 1200° C. The precursor gas may be mixed with hydrogen, the presence of hydrogen being advantageous in particular with ethylene since it then leads to nanotube growth that is faster and more complete. The precursor gas may also advantageously be diluted in an inert gas, for example nitrogen, in order to encourage uniform distribution and diffusion of the precursor gas throughout the oven. The precursor gas content in the dilution gas may be 10% to 50% by volume, for example. The pressure in the oven is atmospheric pressure, for example. The flow rate of the precursor gas is selected to obtain a transit time through the oven lying in a range a few seconds to a few minutes. Transit time is defined as being the ratio of the empty volume of the oven divided by the flow rate of the precursor gas at the temperature of the oven.

In a variant of the method, step 70 of reducing the catalyst oxide(s) may be performed at the same time as growing the nanotubes, i.e. it may coincide with the beginning of step 80 since such growth can be performed under an atmosphere comprising a mixture of ethylene and hydrogen. Indeed, decomposition of ethylene produces nascent hydrogen.

Figure 4A:
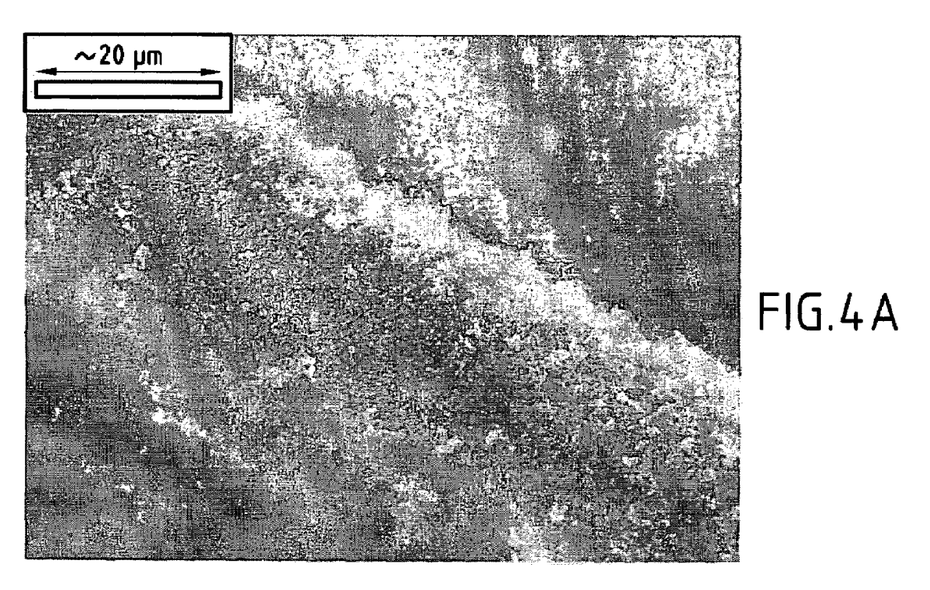
FIGS. 4A, 4B, and 4C are photographs taken with a scanning electron microscope at different magnifications showing the growth of carbon nanotubes on the surface of a carbon fiber.
Figure 4B:
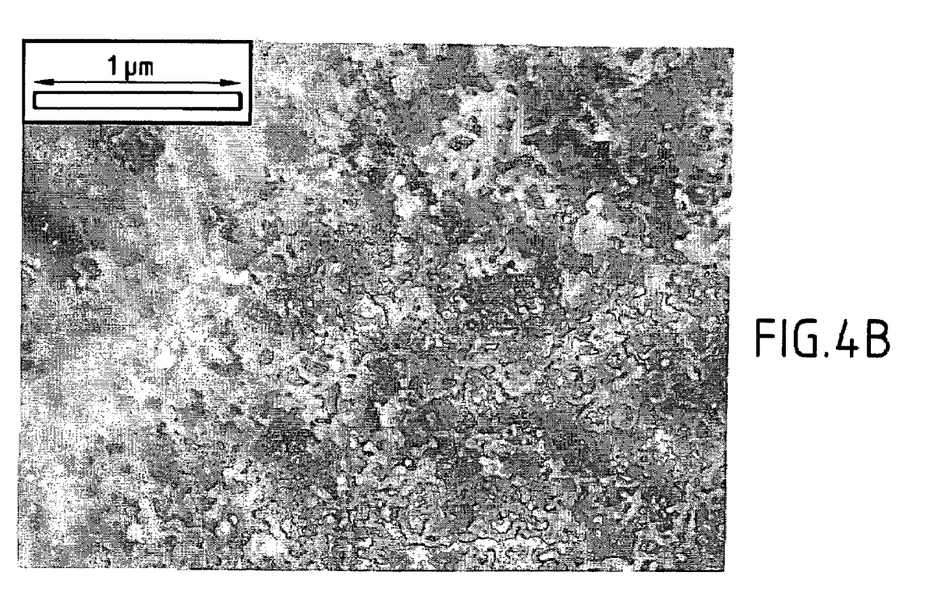
Figure 4C:
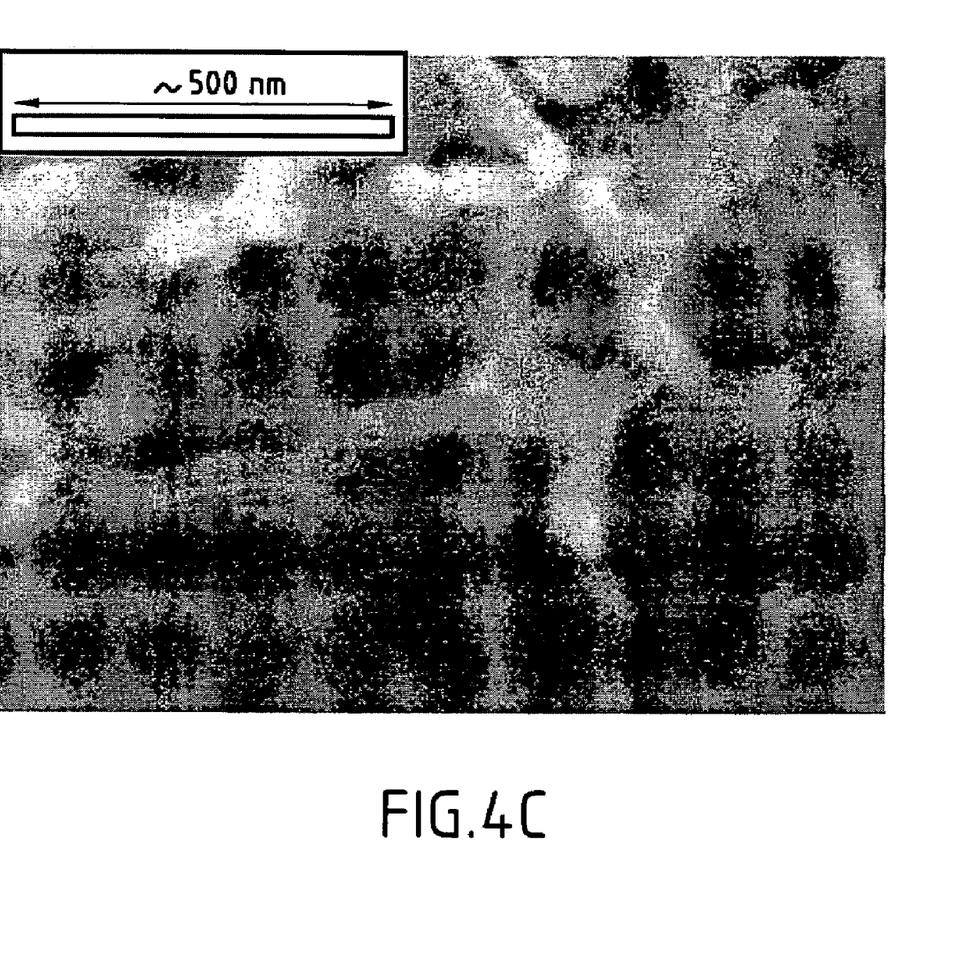

The presence of particles of catalyst metal on the fibers causes carbon nanotubes to grow from the surface of the fibers, at the periphery of the fibers, in random orientations, as shown in FIGS. 4A, 4B, and 4C which apply to a fiber having a cellulose precursor (viscose). In FIGS. 4A and 4B the fiber remains visible in part. FIG. 4C shows the appearance of nanotubes.

The duration of the process is selected as a function of the quantity of carbon nanotubes that are to be introduced in the 3D substrate of refractory fibers, as a function of the quantity of catalyst, and as a function of the size of the substrate. This duration may be several tens of minutes to several hours.

The quantity of carbon nanotubes is selected to be sufficient to provide a significant improvement to the properties of the fiber structure, while nevertheless not closing off its pores beyond a limit from which subsequent densification of the fiber structure could be made more difficult by penalizing access to all of the pores inside the fiber structure. The quantity of carbon nanotubes formed preferably lies in the range 5% to 200% by weight relative to the weight of the 3D substrate of refractory fibers.

Final treatment for eliminating particles of catalyst metal (step 90) can be performed prior to using the 3D fiber structure, in particular as a fiber reinforcement for parts made of composite material. Such treatment may consist in acid attack, for example using hydrochloric acid, and/or in heat treatment at high temperature, above 1800° C. or even 2000° C. in order to eliminate metal particles by evaporation.

It should be observed that various processes, including the process described above, are known for growing carbon nanotubes by depositing particles of metal catalyst on a support and by cracking a precursor gas, and these processes are suitable for implementing the method of the invention. For example, the cracking may be plasma-assisted.

Figure 2:
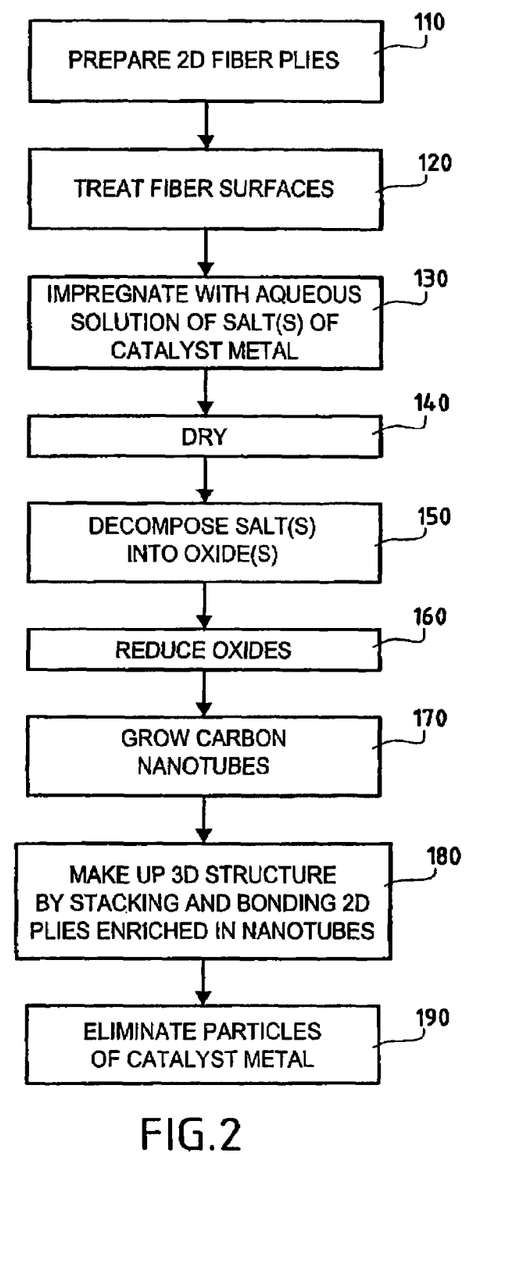
FIG. 2 shows the successive steps of another implementation of a method of the invention.

Another implementation of the method of the invention is summarized by FIG. 2.

This implementation comprises a step 110 of preparing 2D fiber plies, an (optional) step 120 of processing the surface of the fibers, and a step 130 of impregnating the 2D plies with an aqueous solution of one or more salts of metal catalyst for growing carbon nanotubes, similar to steps 10, 20, and 30 of the method of the first implementation described above with reference to FIG. 1.

After impregnation, the 2D plies are dried, e.g. by being passed through a ventilated stove (step 140).

The catalyst salt(s) is/are decomposed into oxide(s) (step 150), and the oxide(s) is/are then reduced (step 160) as described above with reference to steps 60 and 70 of the method of the FIG. 1 implementation.

Thereafter, a step 170 of growing carbon nanotubes on the refractory fibers of the 2D substrates is performed in a manner similar to that described for the step 80 of the method of the FIG. 1 implementation.

The carbon nanotubes are advantageously grown on the 2D substrates of carbon fibers on a continuous basis, i.e. by causing the 2D substrates to travel continuously through an oven.

This produces 2D fiber plies of refractory fibers enriched with carbon nanotubes.

A 3D fiber structure is made by superposing and bonding together the resulting 2D fiber plies (step 180). Bonding may be performed by implanting yarns, by stitching, or by needling. When needling is used, the 2D plies are preferably moistened prior to being superposed in order to reduce their stiffness and in order to avoid nanotubes or nanotube dust being expelled into the surroundings. They may also be provided with a layer or web of discontinuous fibers in the form of free fibers, mat, felt, or burst sliver, which discontinuous fibers constitute a source of fibers suitable for being taken by the needles in order to be transferred through the plies. The needling may be performed as described in document U.S. Pat. No. 4,790,052.

The 3D fiber structure may be made by stacking and bonding together 2D plies that are similar to one another, being formed of refractory fibers that have been enriched with carbon nanotubes in the same manner. This provides a 3D structure that is enriched in carbon nanotubes in a manner that is substantially uniform throughout its entire volume.

In a variant, it is possible to make a 3D fiber structure in which the quantity of carbon nanotubes varies across the thickness of the structure. For this purpose, 2D plies are made that are enriched with differing quantities of carbon nanotubes, and they are superposed so as to obtain the desired distribution of carbon nanotubes within the 3D structure. It is possible to use 2D fiber plies of the kind obtained at the end of step 110 to constitute zones of the 3D fiber structure that are free from carbon nanotubes, if so desired.

Final treatment 190 can be performed to eliminate particles of metal catalyst in a manner similar to the treatment of step 90 of the method of the FIG. 1 implementation. This treatment may be performed on the 2D plies enriched in carbon nanotubes prior to making up the 3D structure.

Figure 3:
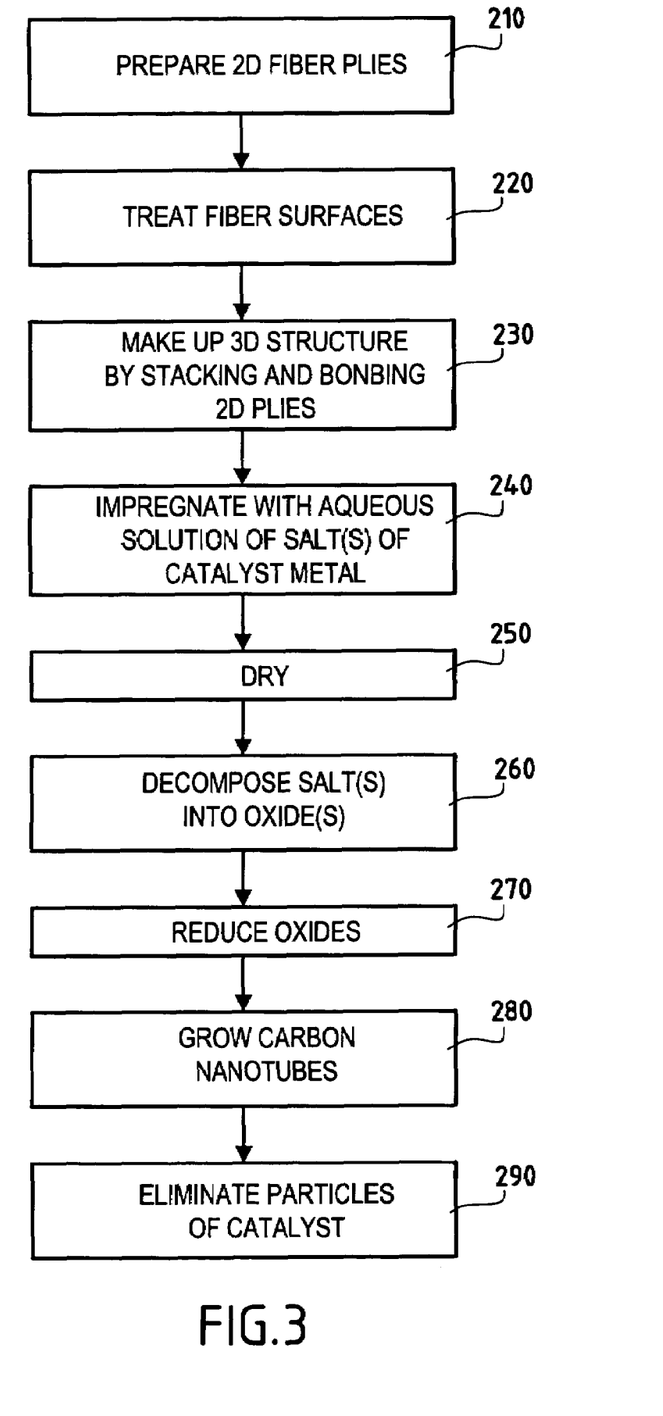
FIG. 3 shows the successive steps of yet another implementation of a method of the invention.

FIG. 3 shows a third implementation of the method of the invention.

It comprises a step 210 of preparing 2D fiber plies and an (optional) step 220 of performing surface treatment on the fibers similar to the steps 10 and 20 of the method in the implementation described above with reference to FIG. 1.

The 2D fiber plies are stacked and bonded together to form a 3D fiber substrate of refractory fibers (step 230). The plies can be bonded together by implanting yarns, by stitching, or by needling, with needling then being performed as described in document U.S. Pat. No. 4,790,052, for example.

It should be observed that, in a variant, the (optional) step of performing surface treatment on the fibers may be performed after the 3D fiber substrate has been formed.

The resulting 3D fiber substrate is impregnated with an aqueous solution of one or more salts of metal suitable for catalyzing carbon nanotube growth (step 240) in a manner similar to that described above with reference to step 30 of the FIG. 1 implementation. Nevertheless, it is preferable to perform impregnation by immersing the 3D substrate in a bath, possibly while also establishing suction in order to encourage impregnation to the core.

Thereafter, the following steps are performed: (drying (250), decomposing the catalyst salt(s) into oxide(s) (260), reducing the oxide(s) (270), growing carbon nanotubes (280), and optionally eliminating particles of catalyst metal (290), in a manner similar to that described above with reference to steps 50, 60, 70, 80, and 90 of the FIG. 1 implementation of the invention.

It should be observed that the third implementation as described above may be implemented by preparing the 3D fiber substrate by processes other than stacking and bonding together 2D fiber plies. Step 220 and the following steps can thus be applied to 3D fiber substrates constituted by thick felts or obtained by three-dimensional weaving, knitting, or braiding of yarns or tows.

In the implementations described above, optional surface treatment of the fibers (steps 20, 120, 220) is performed prior to impregnating the fibers with an aqueous solution of one or more salts of catalyst. In a variant, the surface treatment may be performed after said impregnation and drying, prior to reducing the catalyst.

Placing the particles of catalyst metal on the fibers by impregnation using a liquid composition serves to ensure that the particles are well distributed in discontinuous manner on the fibers. Such a distribution is facilitated by the prior surface treatment of the fibers.

Figure 5:
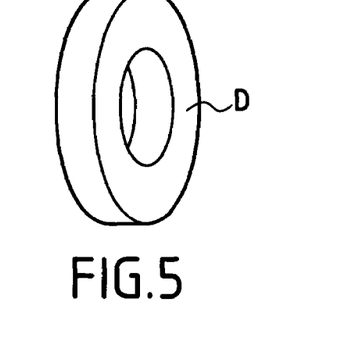
FIG. 5 shows a brake disk.

A 3D porous fiber fabric enriched in carbon nanotubes as obtained by the method constituting any of the implementations of FIGS. 1 to 3 is suitable, possibly after being cut to shape, for making up a fiber preform (or fiber reinforcement) of a part made of thermostructural composite material, such as a carbon fiber reinforcement for a friction part in particular a brake disk D as shown by FIG. 5. The part is obtained by densifying the preform with the material constituting the matrix of the composite material. As mentioned at the beginning of the description, the liquid and CVI processes for densifying fiber preforms in order to form a carbon or a ceramic matrix are themselves well known.

The carbon nanotubes formed on the fibers of the fiber substrate serve to subdivide the pores of that substrate by being distributed throughout those pores. The time needed for densifying the preform is thus reduced. It should be observed that the nanotubes can be separated from the fibers on which they have grown and to which they adhere, e.g. by applying ultrasound energy to the fiber substrate. Nanotubes released in this way are distributed in substantially uniform manner throughout the pores of the substrate.

In addition, the random orientations of the nanotubes around the fibers results, after densification by the matrix, in matrix material being deposited on nanotubes which are macroscopically randomly oriented relative to the fibers of the substrate.

In addition, the presence of carbon nanotubes within the fiber reinforcement of the thermostructural composite material part improves the mechanical properties and the resistance to wear of the part by reducing porosity while benefiting from the reinforcing qualities of nanotubes and also benefiting from the properties provided by the cohesion and the organization of the 3D fiber substrate carrying the carbon nanotubes.

The presence of carbon nanotubes also makes it possible to improve the thermal conductivity of the part.

After obtaining a 3D porous fiber structure enriched in carbon nanotubes as described above, and prior to densifying it, additional carbon nanotubes may be introduced into a surface portion of the fiber structure in order to fill to a great extent the pores in the vicinity of the surface of the fiber structure. During subsequent densification by the liquid process or by CVI, the deposited matrix can then easily close off the surface pores so as to obtain a composite material part having a sealed surface. The introduction of additional carbon nanotubes may be performed on a fraction only of the surface of the 3D fabric, or over its entire surface.

The additional carbon nanotubes are made separately and put into suspension in a liquid, e.g. water. The suspension is brought to the surface of the 3D fabric. In order to facilitate introducing nanotubes to a certain depth from the surface, a wetting agent or surfactant may be added to the suspension, e.g. sodium dodecylsulfate, as described in particular in documents WO 01/063028 and WO 02/055769.

Examples of making a 3D fiber structure out of refractory fibers enriched in carbon nanotubes in accordance with the invention are described below.

EXAMPLE 1

Carbon cloth plies made of cellulose precursor that had been subjected to carbonization treatment at a temperature of up to 1200° C. were impregnated in a 0.2 molar aqueous solution of iron nitrate. Twenty plies impregnated in this way were stacked and needled to one another. The needling was performed progressively as increasing number of plies were stacked, so as to ensure that the needles penetrated to a substantially constant depth, as described in document U.S. Pat. No. 4,790,052.

The resulting moist 3D fiber structure was dried in air at 200° C. in a ventilated stove, which also caused the iron nitrate to decompose into oxide. The 3D fiber structure was introduced into an oven where the temperature was raised to 700° C. under an inert atmosphere (nitrogen) to avoid oxidizing the carbon. The oxide was then reduced by introducing a reducing atmosphere into the oven, said atmosphere comprising a mixture of equal volume fractions of ammonia gas and nitrogen for a period of about 60 minutes (min). Thereafter, the temperature was maintained at 700° C. and a gas was introduced into the oven comprising acetylene diluted in nitrogen (1 volume of acetylene for 3 volumes of nitrogen) for a duration of 12 hours (h). After cooling to ambient temperature under nitrogen, carbon nanotubes were observed to be present extending from the surface of the carbon fibers of the 3D structure. The increase in weight as measured relative to the weight of the dry cloth plies was about 100%.

EXAMPLE 2

Carbon cloth plies of cellulose precursor of the same kind as in Example 1 were impregnated in a 0.05 molar aqueous solution of iron nitrate.

The plies were dried under air at 200° C. in a ventilated stove, thereby also causing the iron nitrate to decompose into oxide. The dried plies were introduced into an oven where the temperature was raised to 700° C. under an inert atmosphere (nitrogen). The oxygen was then reduced by introducing a reducing atmosphere into the oven constituted by a mixture of equal volume fractions of ammonia gas and nitrogen for a duration of 30 min. Thereafter, with the temperature being maintained at 700° C., a gas was introduced into the oven comprising acetylene diluted in nitrogen (1 volume of acetylene for 3 volumes of nitrogen) for a duration of 2 h. After cooling to ambient temperature under nitrogen, carbon nanotube growth on the carbon fibers of the plies was observed, and the measured increase in weight relative to the initial cloth plies was about 50%.

The resulting plies were made more flexible by being moistened and they were provided with webs of free discontinuous carbon fibers (fiber mats) which were deposited on the surfaces of the plies and bonded thereto by needling.

A plurality of carbon nanotube-enriched plies made flexible by moistening and provided with fiber webs were superposed and bonded to one another by needling which was performed as stacking progressed, e.g. as described in document U.S. Pat. No. 4,790,052. After needling, the resulting 3D fiber structure was dried in a ventilated stove at 150° C.

EXAMPLE 3

The same procedure as in Example 2 was performed except that the cloth plies were impregnated with a 0.2 molar aqueous solution of nickel nitrate and the duration of carbon nanotube growth was extended to 10 h instead of 2 h. The measured increase in weight after the cloth plies had been enriched in carbon nanotubes was about 175%.

EXAMPLE 4

Cloth plies of carbon from a PAN precursor were treated with acetone to eliminate the oiling of the carbon fibers and then impregnated with a 0.2 molar solution of nickel nitrate.

The plies were dried in air at 200° C. in a ventilated stove, thereby also decomposing the nickel nitrate into oxide.

Oxidation was performed in air at 420° C. for 30 min in an oven in order to perform surface treatment on the carbon fibers (moderate activation). The plies were then raised to a temperature of 600° C. in an inert atmosphere (nitrogen). The oxide was then reduced by introducing a reducing atmosphere into the oven constituted by a mixture in equal volume fractions of ammonia gas and nitrogen for a duration of 30 min. Thereafter, while the temperature was maintained at 600° C., a gas was introduced into the oven comprising acetylene diluted in nitrogen (1 volume of acetylene for 3 volumes of nitrogen) for a duration of 2 h. After cooling under nitrogen to ambient temperature, carbon nanotube growth was observed on the carbon fibers of the plies, and the increase in weight measured relative to the initial cloth plies was about 150%.

The carbon nanotube enriched plies were then moistened, provided with free fiber webs, and then stacked and bonded to one another by needling, as in Example 2.

EXAMPLE 5

Cloth plies of cellulose precursor of the kind used in Example 1 were superposed and bonded together by needling. The needling was performed progressively while the plies were being stacked so as to maintain a substantially constant penetration depth for the needles, as described in document U.S. Pat. No. 4,790,052.

The resulting 3D fiber substrate was impregnated with an aqueous solution of iron nitrate containing 0.2% molar of iron. The impregnation was performed by soaking in a bath.

The resulting 3D fiber structure was then treated (dried with the iron nitrate decomposing into oxide, reduction of the oxide, and growth of carbon nanotubes) as in Example 1. The final measured increase in weight compared with the weight of the dry 3D substrate was about 100%.

EXAMPLE 6

Plies constituted by sheets of carbon from PAN precursor yarns were superposed and bonded together by needling progressively while stacking was taking place. The sheets were multidirectional sheets made up of several unidirectional sheets of discontinuous carbon fibers laid in several directions and bonded together, e.g. as described in document WO 98/44183. Needling was performed progressively while the plies were being stacked so as to ensure that the needles had substantially constant penetration depth, as described in document U.S. Pat. No. 4,790,052.

The resulting 3D fiber substrate was treated with acetone to eliminate the oiling on the carbon fibers and was then impregnated by being soaked in a bath of an aqueous solution of nickel nitrate containing 0.2% molar of nickel.

After drying in air at 200° C. in a ventilated stove, thereby also decomposing the nickel nitrate into oxide, oxidation was performed in air at 420° C. in an oven for 30 min in order to perform surface treatment (moderate oxidation) on the carbon fibers of the substrate. The temperature was then raised to 600° C. under an inert atmosphere (nitrogen). The oxide was then reduced by introducing a reducing atmosphere into the oven, constituted by a mixture in equal volume fractions of ammonia gas and nitrogen, for a duration of 30 min. Thereafter, with the temperature being maintained at 600° C., a gas was introduced into the oven comprising acetylene diluted in nitrogen (1 volume of acetylene for 3 volumes of nitrogen) for a duration of 12 h. After cooling under nitrogen to ambient temperature, carbon nanotube growth on the carbon fibers of the substrate was observed, with the increase in weight relative to the dry needled substrate being about 150%.

EXAMPLE 7

PAN precursor high strength carbon fiber cloth plies were subjected to surface treatment by an oxygen plasma for 3 min in order to encourage a good distribution of the metal catalyst, and were then impregnated in a 0.2 molar aqueous solution of nickel nitrate.

The impregnated plies were dried in air at 150° C. causing the nickel nitrate to decompose into oxide. The oxide was reduced at 650° C. in an enclosure in a reducing atmosphere constituted by nitrogen $N_2$ with 7% by volume hydrogen. At the temperature of 650° C., a mixture was subsequently introduced comprising, by volume, ⅔ ethylene and ⅓ nitrogen containing 7% hydrogen. Nanotube growth was performed under such conditions for 5 h.

The measured increase in weight relative to the weight of the dry cloth plies was about 70%.

The carbon nanotube enriched plies were suitable for use in making a three-dimensional fiber substrate, e.g. in the manner described in Example 2.

EXAMPLE 8

High strength fiber cloth plies of carbon from a PAN precursor were subjected to surface treatment by argon plasma for 5 min, and then impregnated in a 0.1 molar solution of cobalt nitrate in ethanol.

The impregnated plies were raised to a temperature of 650° C. under an atmosphere of nitrogen $N_2$, and the resulting cobalt oxide was reduced at this temperature under a reducing atmosphere comprising, by volume, ⅔ nitrogen $N_2$ and ⅓ hydrogen $H_2$. Thereafter, at this temperature of 650° C., carbon nanotube growth was performed as in Example 7.

The increase in weight as measured relative to the weight of the dry cloth plies was about 99%.

The carbon nanotube enriched plies were suitable for use in making a three-dimensional fiber substrate, e.g. in the manner described in Example 2.

EXAMPLE 9

Needled three-dimensional carbon fiber substrates were made in the form of rings, each substrate having an outside diameter of 150 millimeters (mm), an inside diameter of 80 mm, a thickness of 40 mm, a fiber volume content of 22% (i.e. 22% of the apparent volume of the substrate was indeed occupied by the fibers), and a weight of 180 grams (g). Such substrates can be obtained by cutting out a fiber structure formed by superposing and needling together 2D plies as described in document U.S. Pat. No. 4,790,052, in particular.

The 3D substrates were impregnated under a primary vacuum by a 0.05 molar solution of nickel nitrate in ethanol.

After drying under a hood for 5 h, the substrates were placed in a stove and their temperature raised to 150° C. under an atmosphere of nitrogen $N_2$. The nickel nitrate was then decomposed into oxide and surface treatment (controlled oxidation) was applied to the carbon fibers by maintaining the substrates at 420° C. in a reactor for 20 min under an atmosphere of nitrogen $N_2$ containing 1% by volume of oxygen $O_2$ at a pressure of 700 millibars (mbar).

After the atmosphere in the reactor had been purged by being swept with nitrogen $N_2$, its temperature was raised from 420° C. to 650° C. and initially a mixture of hydrogen $H_2$ and nitrogen $N_2$ in equal volumes was introduced for 60 min, followed by hydrogen $H_2$ for 10 min, while the pressure was maintained at 700 mbar.

With the temperature being maintained at 650° C., nanotube growth was implemented by causing a gas to flow through the reaction comprising, by volume, ⅓ hydrogen $H_2$ and ⅔ ethylene $C_2H_4$ for 6 h.

The final measured increase in weight relative to the weight of the dry substrates was about 41%.

EXAMPLE 10

Brake disk preforms were produced in the form of annular three-dimensional fibrous substrates made of carbon fibers. To this end, 2D plies were made using unidirectional (UD) sheets obtained by spreading high strength carbon fiber tows, the UD sheet being superposed with 3 different directions forming with each other angles of ±60° and being bonded together by light needling.

The 2D plies were superposed and bonded together by needling as disclosed in U.S. Pat. No. 4,790,052 until a desired thickness was obtained and annular preforms for brake disks were cut from the thus obtained plates.

The resulting preforms were impregnated under vacuum by a 0.05 molar solution of nickel nitrate in ethanol and dried at 110° C. The temperature was then raised to 250° C. under an atmosphere of nitrogen $N_2$ in order to decompose the nickel nitrate air during about 1 hour in order to slightly oxidize the surface of the fibers.

The preforms were placed in a furnace under an atmosphere of nitrogen and their temperature were raised to 650° C. Hydrogen gas $H_2$ was then added to the nitrogen in a volumic ratio of 1/1 to reduce the nickel oxide, during about 1 hour, and the mixture $N_2/H_2$ was replaced with a mixture $H_2/C_2H_4$, in a volumic ratio of 2/1, during about 6 hours in order to cause nanotubes to grow. An increase in weight of 40% was measured compared with the weight of the dry preforms. A thermal treatment at about 2200° C. was then carried out.

The preforms were densified with a pyrolytic carbon (PyC) matrix by chemical vapor infiltration until a density of 1.8 was reached.

Brake disks in C/C composite material such as shown by FIG. 5 were obtained, which included a carbon fibrous reinforcement densified with a matrix, the carbon fibrous reinforcement comprising a 3D structure made of a plurality of superposed plies needled together and carbon nanotubes distributed within the matrix in spaces corresponding to the original pores of the fibrous structure.

The brake disks were tested on a friction bench under different conditions including emergency braking conditions.

Figure 6:
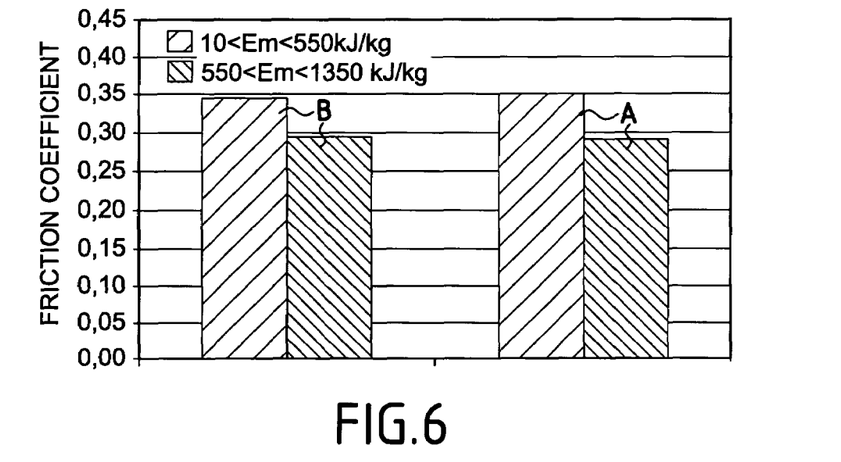
FIGS. 6 and 7 show the friction coefficient and wear measured with friction parts made with reinforcing fiber structures according to the invention and according to the prior art.
Figure 7:
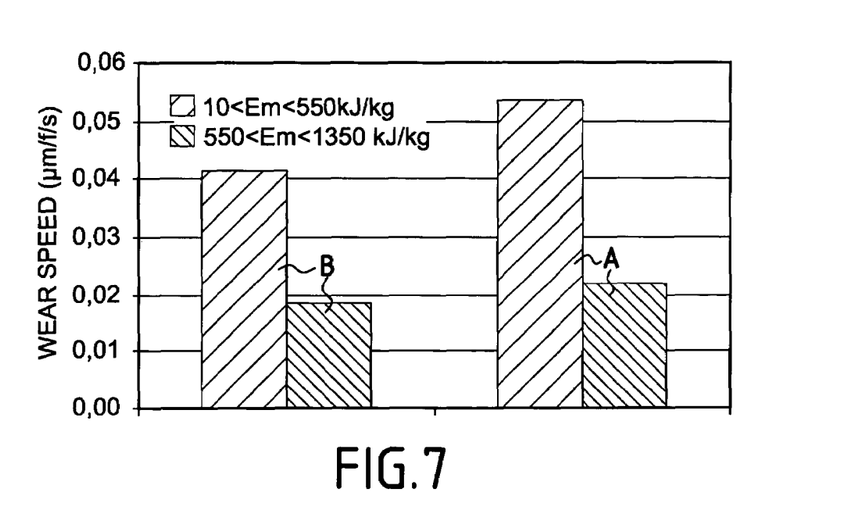

FIGS. 6 and 7 show the results obtained with such disks (B) in terms of friction coefficient and wear (measured in microns per friction face per second: μ/f/s), for braking energies (Em) ranging between 10 kJ/kg and 550 kJ/kg (kilojoules per kg of C/C composite material) and between 550 kJ/kg and 1350 kJ/kg. FIGS. 5 and 6 also show results obtained with brake disks (A) according to the prior art, namely disks obtained as described above but without addition of nanotubes. Disks B exhibit a reduced wear with a substantially unchanged friction coefficient as compared with disks A.

EXAMPLE 11

2D plies were produced from unidirectional sheets made by spreading and stretch-breaking high strength carbon slivers, two UD sheets being superposed making an angle of ±45° with each other and being assembled by a cotton stitching thread.

The thus obtained 2D plies were impregnated by traveling through a bath composed of 0.10 molar solution of iron nitrates in ethanol. After drying and decomposition of the iron nitrates under conditions similar to those indicated for nickel nitrate in Example 10, the plies were cut in the form of annular disks and placed in a furnace. Reduction of the nitrates under $H_2$ and growing of carbon nanotubes were carried out under conditions similar to those of Example 10. A weight increase of 21% with respect to the weight of the dry 2D plies was measured.

2D plies thus enriched with nanotubes were superposed and bonded together by needling with a web of free carbon fibers having a density of about 40 g/m² being deposited on each layer. The process was carried on until a desired thickness of about 25 mm was obtained. The volume ratio of carbon fibers in the disk preforms obtained was about 25%. The preforms were thereafter densified by a PyC matrix by chemical vapor infiltration.

Friction tests carried out as in Example 10 have shown results similar to those obtained with disks B of Example 10.

The invention claimed is:

1. A method of making a porous three-dimensional fiber structure comprising a coherent three-dimensional substrate of refractory fibers, wherein carbon nanotubes are incorporated in the fiber structure by being grown on the refractory fibers of the substrate, after impregnation by a composition comprising at least one catalyst for carbon nanotube growth, so as to obtain a three-dimensional structure made of refractory fibers and enriched in carbon nanotubes.

2. A method according to claim 1, comprising the successive steps of:
impregnating two-dimensional plies of refractory fibers with a composition containing at least one catalyst for carbon nanotube growth;
forming a three-dimensional substrate by superposing arid bonding together a plurality of impregnated two-dimensional plies; and
causing carbon nanotubes to grow within the three-dimensional substrate.

3. A method according to claim 2, wherein the two-dimensional plies are bonded together by needling.

4. A method according to claim 1, comprising the successive steps of:
a) impregnating refractory fiber two-dimensional plies with a composition containing at least one catalyst for carbon nanotube growth;
b) causing carbon nanotubes to grow within the two-dimensional plies; and
c) forming the three-dimensional fiber structure by superposing and bonding together two-dimensional plies of refractory fibers in which at least some of the plies contain carbon nanotubes obtained by steps a) and b).

5. A method according to claim 4, wherein the three-dimensional fiber structure is formed by stacking two-dimensional plies having varying quantities of carbon nanotubes.

6. A method according to claim 4, wherein the two-dimensional plies are bonded together by needling.

7. A method according to claim 6, wherein a layer of free fibers is deposited on each of at least some of the two-dimensional plies, prior to needling.

8. A method according to claim 6, wherein the two-dimensional plies with carbon nanotubes are moistened prior to needling.

9. A method according to claim 1, comprising the successive steps of:
making a three-dimensional substrate of refractory fibers;
subsequently impregnating the substrate with a composition containing at least one catalyst for carbon nanotube growth; and
causing carbon nanotubes to grow within the three-dimensional substrate.

10. A method according to claim 9, wherein making the three-dimensional substrate includes superposing arid bonding together two-dimensional plies.

11. A method according to claim 10, wherein the three-dimensional plies are bonded together by needling.

12. A method according to claim 9, wherein the three-dimensional substrate of refractory fibers is made by three-dimensional weaving, knitting, or braiding.

13. A method according to claim 2, wherein impregnation is performed using a composition containing at least one catalyst for carbon nanotube growth on refractory fibers having a specific surface area of not less than 10 m².g.

14. A method according to claim 2, wherein a surface treatment is performed on the refractory fibers in order to impart a specific surface area thereon of not less than 10 m².g.

15. A method according to claim 14, wherein the surface treatment is performed by controlled oxidation.

16. A method according to claim 14, wherein the surface treatment is performed by acid attack.

17. A method according to claim 14, wherein the surface treatment of the refractory fibers is performed prior to impregnation with a composition containing at least one catalyst for carbon nanotube growth.

18. A method according to claim 14, wherein, the surface treatment of the refractory fibers is performed after impregnation with a composition containing at least one catalyst for carbon nanotube growth.

19. A method according to claim 2, wherein impregnation is performed with a composition containing a solution of at least one salt of a metal constituting a catalyst for carbon nanotube growth.

20. A method according to claim 19, further including a step of eliminating particles of metal catalyst after the carbon nanotube enriched three-dimensional structure has been made.

21. A method according to claim 1, wherein additional carbon nanotubes are introduced into the pores of at least one surface portion of the fiber structure.

22. A method according to claim 21, wherein additional carbon nanotubes are introduced by bringing a suspension of carbon nanotubes in a liquid to the surface of the fiber structure.

* * * * *

UNITED STATES PATENT AND TRADEMARK OFFICE
CERTIFICATE OF CORRECTION

PATENT NO. : 7,384,663 B2  Page 1 of 1
APPLICATION NO. : 11/077005
DATED : June 10, 2008
INVENTOR(S) : Pierre Olry et al.

It is certified that error appears in the above-identified patent and that said Letters Patent is hereby corrected as shown below:

Title page, (75) Inventors, "la Source" should read --La Source--;

Title page, (75) Inventors, "Nathalie Nicolaus, Lyons (FR);" should read --Nathalie Nicolaus, Lyon (FR);--

Title page, (75) Inventors, "Eric Sion, Lyons (FR)" should read --Eric Sion, Lyon (FR)--;

Column 13, line 52, "oxygen 02" should read --oxygen $O_2$--;

Column 15, claim 2, line 30, "arid bonding" should read --and bonding--; and

Column 16, claim 10, line 10, "arid" should read --and--.

Signed and Sealed this

Thirtieth Day of December, 2008

JON W. DUDAS
*Director of the United States Patent and Trademark Office*